(12) United States Patent
Hertz et al.

(10) Patent No.: US 11,553,025 B2
(45) Date of Patent: *Jan. 10, 2023

(54) SYSTEM AND METHOD FOR INTERLEAVED MEDIA COMMUNICATION AND CONVERSION

(71) Applicant: GLIDE TALK LTD., Jerusalem (IL)

(72) Inventors: Liron Hertz, Givataim (IL); Roi Ginat, Ramat Gan (IL)

(73) Assignee: GLIDE TALK LTD., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/236,332

(22) Filed: Apr. 21, 2021

(65) Prior Publication Data

US 2021/0314381 A1 Oct. 7, 2021

Related U.S. Application Data

(63) Continuation of application No. 16/250,104, filed on Jan. 17, 2019, now Pat. No. 10,992,725, which is a
(Continued)

(51) Int. Cl.
*G06F 15/16* (2006.01)
*H04L 65/75* (2022.01)
(Continued)

(52) U.S. Cl.
CPC .......... *H04L 65/762* (2022.05); *H04L 1/0071* (2013.01); *H04L 43/087* (2013.01);
(Continued)

(58) Field of Classification Search
CPC ... H04L 65/602; H04L 1/0071; H04L 43/087; H04L 65/605; H04L 65/607; H04L 69/08
(Continued)

(56) References Cited

U.S. PATENT DOCUMENTS 5,758,092 A 5/1998 Agarwal
7,644,340 B1 1/2010 Liu
(Continued)

OTHER PUBLICATIONS

International Search Report dated Nov. 28, 2017, in International Application No. PCT/IB2017/000642; 4 pages.
(Continued)

*Primary Examiner* — Khanh Q Dinh
(74) *Attorney, Agent, or Firm* — Finnegan, Henderson, Farabow, Garrett & Dunner LLP

(57) ABSTRACT

A method or system configured for receiving a first single data stream representing a first multimedia file, the first single data stream including an interleaved sequence of data elements of a plurality of media, and/or transmitting a second single data stream representing a second multimedia file, the second single data stream including an interleaved sequence of data elements of said plurality of media, where the second multimedia file differs from said first multimedia file by at least one data element of a selected medium extracted from said first multimedia file, and/or by at least one data element of a selected medium added to the first multimedia file, and/or by at least one data element of a selected medium added to the first multimedia file being a converted version of the at least one data element of a selected medium extracted from the first multimedia file.

16 Claims, 10 Drawing Sheets

Related U.S. Application Data continuation of application No. 16/300,381, filed as application No. PCT/IB2017/000642 on May 12, 2017, now Pat. No. 10,986,154.

(60) Provisional application No. 62/337,080, filed on May 16, 2016.

(51) Int. Cl.

| | |
|---|---|
| H04L 69/08 | (2022.01) |
| H04L 65/61 | (2022.01) |
| H04L 65/70 | (2022.01) |
| H04L 1/00 | (2006.01) |
| H04L 43/087 | (2022.01) |
| H04N 21/258 | (2011.01) |

(52) U.S. Cl.
CPC .............. *H04L 65/61* (2022.05); *H04L 65/70* (2022.05); *H04L 65/765* (2022.05); *H04L 69/08* (2013.01); *H04N 21/25825* (2013.01); *H04N 21/25833* (2013.01)

(58) Field of Classification Search
USPC ................................ 709/220, 224, 227, 228
See application file for complete search history.

(56) References Cited

U.S. PATENT DOCUMENTS

| | | | | |
|---|---|---|---|---|
| 8,132,076 | B1* | 3/2012 | Liu | H03M 13/2732 |
| | | | | 714/701 |
| 8,788,716 | B2 | 7/2014 | Kobayashi | |
| 8,873,453 | B2 | 10/2014 | Manapragada et al. | |
| 8,875,193 | B2 | 10/2014 | Manapragada et al. | |
| 9,021,330 | B2 | 4/2015 | Purohit | |
| 9,185,445 | B2* | 11/2015 | Kirksey | H04N 21/6334 |
| 9,596,322 | B2 | 3/2017 | Uyehara et al. | |
| 9,686,379 | B2 | 6/2017 | Uyehara et al. | |
| 10,033,483 | B2 | 7/2018 | Hassan | |
| 10,418,997 | B2* | 9/2019 | Sakaguchi | H03K 19/018521 |
| 10,986,154 | B2* | 4/2021 | Hertz | H04L 43/087 |
| 10,992,725 | B2* | 4/2021 | Hertz | H04L 43/087 |
| 2001/0013068 | A1 | 8/2001 | Klemets et al. | |
| 2003/0200336 | A1 | 10/2003 | Pal et al. | |
| 2004/0038653 | A1 | 2/2004 | Claussen et al. | |
| 2006/0092938 | A1* | 5/2006 | Gentrix | H04N 21/235 |
| | | | | 375/E7.024 |
| 2006/0156217 | A1 | 7/2006 | Ertel et al. | |
| 2008/0270528 | A1* | 10/2008 | Girardeau | H04L 1/0007 |
| | | | | 709/203 |
| 2009/0041021 | A1 | 2/2009 | Meany et al. | |
| 2010/0008214 | A1 | 1/2010 | Siaud et al. | |
| 2011/0126127 | A1* | 5/2011 | Mariotti | H04M 7/0027 |
| | | | | 715/753 |
| 2011/0216857 | A1 | 9/2011 | Gotman et al. | |
| 2013/0030875 | A1* | 1/2013 | Lee | G06Q 30/0601 |
| | | | | 705/14.58 |
| 2013/0120651 | A1* | 5/2013 | Perry | H04N 21/8358 |
| | | | | 348/441 |
| 2014/0163980 | A1 | 6/2014 | Tesch et al. | |
| 2014/0188837 | A1* | 7/2014 | Zhou | G06F 16/2465 |
| | | | | 707/709 |
| 2015/0163272 | A1 | 6/2015 | Manapragada et al. | |
| 2015/0288436 | A1 | 10/2015 | Raju et al. | |
| 2015/0365501 | A1 | 12/2015 | Uyehara et al. | |
| 2015/0365502 | A1 | 12/2015 | Uyehara et al. | |
| 2016/0140972 | A1 | 5/2016 | Dick et al. | |
| 2016/0337426 | A1* | 11/2016 | Shribman | H04L 65/612 |
| 2018/0323832 | A1 | 11/2018 | Uyehara et al. | |
| 2019/0141106 | A1 | 5/2019 | Hertz et al. | |

OTHER PUBLICATIONS

Written Opinion dated Nov. 28, 2017, in International Application No. PCT/IB2017/000642; 9 pages.

* cited by examiner

20 – processor unit(s)
21 – memory unit(s)
22 – storage units(s)
23 – communication unit(s)
24 – graphic processor(s)
25 – display(s)
26 – input/output device(s)
27 – communication bus
28 – power supply
29 – image sensor
30 – computer program(s)

Fig. 10

| 72 → | CC | CMS | A1 | A2 | V1 | V2 | V1 | A1 | A2 | A1 | A2 | V1 | V2 |
|---|---|---|---|---|---|---|---|---|---|---|---|---|---|

| 73 → | CC | CMS | SV | SV | SV | SV | SV | SV | SV | SV | SV | SV | SV |

| 74 → | CC | CMS | P | CD | CD | CD | P | P | CD | CD | P | CD | CD |

| 75 → | CC | CMS | A1 | A1 | V1 | V1 | A1 | A1 | A2 | V1 | V2 | A1 | V1 | SV | CMS |
|---|---|---|---|---|---|---|---|---|---|---|---|---|---|---|---|
| | CD | CD | A1 | A2 | V1 | V2 | CMS | SV | SV | P | CD | A1 | V2 | SV | CD |

| 76 → | CC | CMS | SV* | SV* | SV* | SV* | SV* | SV* | P | CD | CD | SV* | SV* | P | CD | CMS |
|---|---|---|---|---|---|---|---|---|---|---|---|---|---|---|---|---|
| | CD | SV* | SV* | SV* | P | CD | CT1 | GA1 | SV* | SV* | SV* | P | CD | CD | CT1 | GA1 |

SYSTEM AND METHOD FOR INTERLEAVED MEDIA COMMUNICATION AND CONVERSION

PRIORITY

This application is a continuation of U.S. patent application Ser. No. 16/250,104, filed on Jan. 17, 2019, currently allowed, which is a continuation of U.S. patent application Ser. No. 16/300,381, filed on Nov. 9, 2018, which issued as U.S. Pat. No. 10,986,154 on Apr. 20, 2021, and which is a national stage entry of PCT/IB2017/000642, filed on May 12, 2017, which claims priority to U.S. Provisional Application No. 62/337,080, filed on May 16, 2016. The disclosures of the above-referenced applications are expressly incorporated herein by reference in their entireties.

FIELD

The method and apparatus disclosed herein are related to the field of communication, and, more particularly, but not exclusively to systems and methods for storable multimedia communication.

BACKGROUND

Communication networks can transfer various types of content between communication terminals, and communication servers, intermediating between communication terminals, can store and forward various types of content. Communication terminals can generate and consume various types of content. A content type or medium may be sound, speech, picture, video, text, graphics, animation, etc. The combination of such types of content is commonly referred to as multimedia. Communication networks, servers, and terminals can communicate multimedia content, and there are many formats for communicating multimedia content between terminals. However, if a particular multimedia content is generated and communicated in a particular format, it is very difficult to change the characteristics of any particular content type of the multimedia content, or replace any part of the content. There is thus a widely recognized need for, and it would be highly advantageous to have, a system and method for delivering a multimedia content over a network that overcomes the above limitations.

SUMMARY

In the following description certain aspects and embodiments of the present disclosure will become evident. It should be understood that the disclosure, in its broadest sense, could be practiced without having one or more features of these aspects and embodiments. It should also be understood that these aspects and embodiments are examples only.

The disclosed embodiments include methods for communicating a plurality of media over a communication network.

A disclosed method includes obtaining a plurality of media by a transmitter communicatively coupled to said communication network, preparing to transmit said plurality of media to a receiver communicatively coupled to said communication network, and transmitting said plurality of media from said transmitter to said receiver as a single data stream including an interleaved sequence of data elements of said plurality of media, wherein each of said data elements includes data of one type of medium of said plurality of media. The plurality of media is multiplexed in said single data stream by said transmitter and/or de-multiplexed from said single data stream by said receiver. According to the disclosed embodiments, the method includes the receiver further transmitting an extracted data element of a selected medium to a selected second receiver of a plurality of second receivers, wherein said selected second receiver is adapted to provide said selected medium to a user. The receiver may also transmit a plurality of extracted data elements of the plurality of media to a plurality of second receivers, wherein each of said second receivers is adapted to provide at least one respective selected medium to a user, and where the plurality of extracted data elements are transmitted synchronously.

Another disclosed method includes receiving, at a network-accessible device, a first single data stream representing a first multimedia file, said first single data stream including a first interleaved sequence of data elements of said plurality of media, wherein each of said data elements includes data of one type of medium of said plurality of media, and transmitting, from said network-accessible device, a second single data stream representing a second multimedia file derived from the first multimedia file, said second single data stream including a second interleaved sequence of data elements of said plurality of media, wherein each of said data elements includes data of one type of medium of said plurality of media. The second multimedia file differs from said first multimedia file by at least at least one data element of a selected medium extracted from said first multimedia file, and/or by at least one data element of a selected medium added to said first multimedia file, and wherein said at least one data element of said selected medium added to said first multimedia file is a converted version of said at least one data element of said selected medium extracted from said first multimedia file.

The disclosed methods additionally include synchronizing at least one data element of a first medium with at least one other data element of said first medium, and synchronizing at least one data element of said first medium with at least one data element of a second medium. Additional aspects include separating at least one of said single data stream, said first single data stream, and said second single data stream, into a plurality of different types of media.

According to the disclosed methods, at least one of said single data stream, said first single data stream, and said second single data stream comprises a data element describing said plurality of media, and/or a data element identifying a particular medium of said plurality of media, and/or a data element identifying at least one data element hearing a particular medium of said plurality of media. In the disclosed embodiments, a data element describing said plurality of media comprises a plurality of data elements and at least one of said data elements indicates a change in said plurality of media.

The disclosed methods also include extracting at least one data stream element of a first selected medium from a selected one of said single data stream, said first single data stream, and said second single data stream while preserving synchronization with other data stream elements of different media in said selected single data stream, and/or inserting at least one data stream element of a second selected medium into said selected single data stream, wherein said inserted data stream element is synchronized according to said synchronization with at least one other data stream element of different media in said selected single data stream. The disclosed methods also include converting said extracted data stream element into said inserted data stream element, wherein converting comprises converting speech to text, and/or converting text to speech, and/or converting text to image, and/or converting video to still picture, and/or converting still picture to graphics, and/or converting video to animation, and/or converting resolution, and/or converting compression. At least one of the steps of extracting, inserting, and converting is instructed by said receiver or said second receiver, and executed by said first receiver, and/or instructed by a user of said first receiver, and executed by said first receiver.

According to the disclosed embodiments, at least one of said transmitter and said network-accessible device is a first receiver, and the disclosed methods additionally include further transmitting, by said first receiver, a converted single data stream to at least one of said receiver and a second receiver. The converted single data stream includes said selected single data stream without said extracted at least one data stream element, and/or said selected single data stream including said inserted at least one data stream element, and/or said selected single data stream including said converted data stream element.

The disclosed embodiments include adapting said converted single data stream to a characteristic of a communication network connecting said first receiver with said receiver or said second receiver, and/or a characteristic of said receiver or said second receiver, and/or a characteristic of an environment of said receiver or said second receiver. The step of adapting includes analyzing said characteristic of said receiver or said second receiver, communicating an adaptation instruction from said receiver or said second receiver to said first receiver, converting said extracted data stream element into said inserted data stream element in said first receiver, and transmitting said converted data stream element to said receiver or said second receiver.

According to the disclosed embodiments, the characteristic of said communication network comprises network band width, and/or network latency, and/or network jitter. The characteristic of said receiver or said second receiver comprises display resolution, and/or display size, and/or number of pixels in a display, and/or processing power. The characteristic of said environment of said receiver or said second receiver comprises noise conditions, and/or lighting conditions.

According to the disclosed embodiments, the first receiver is adapted to be carried by a user of said receiver or said second receiver and/or adapted to be worn by a user of said receiver or said second receiver.

Other disclosed embodiments include a network communication node including at least one processor configured to perform operations consistent with one or more of the disclosed methods and embodiments.

In accordance with additional embodiments of the present disclosure, a computer program product embodied on a non-transitory computer readable medium is disclosed that stores instructions that, when executed by a processor(s), causes the processor(s) to perform operations consistent with one or more of the disclosed methods and embodiments.

It is to be understood that both the foregoing general description and the following detailed description are by example and explanatory only, and are not restrictive of the disclosed embodiments, as claimed.

BRIEF DESCRIPTION OF THE DRAWINGS

Various embodiments are described herein, by way of example only, with reference to the accompanying drawings. With specific reference now to the drawings in detail, it is stressed that the particulars shown are by way of example and for purposes of illustrative discussion of the preferred embodiments only, and are presented in order to provide what is believed to be the most useful and readily understood description of the principles and conceptual aspects of the embodiment. In this regard, no attempt is made to show structural details of the embodiments in more detail than is necessary for a fundamental understanding of the subject matter, the description taken with the drawings making apparent to those skilled in the art how the several forms and structures may be embodied in practice.

In the drawings:

FIG. 10 is a block diagram of a plurality of multimedia streams received, mixed, and forwarded by a server.

DETAILED DESCRIPTION

Figure 1:
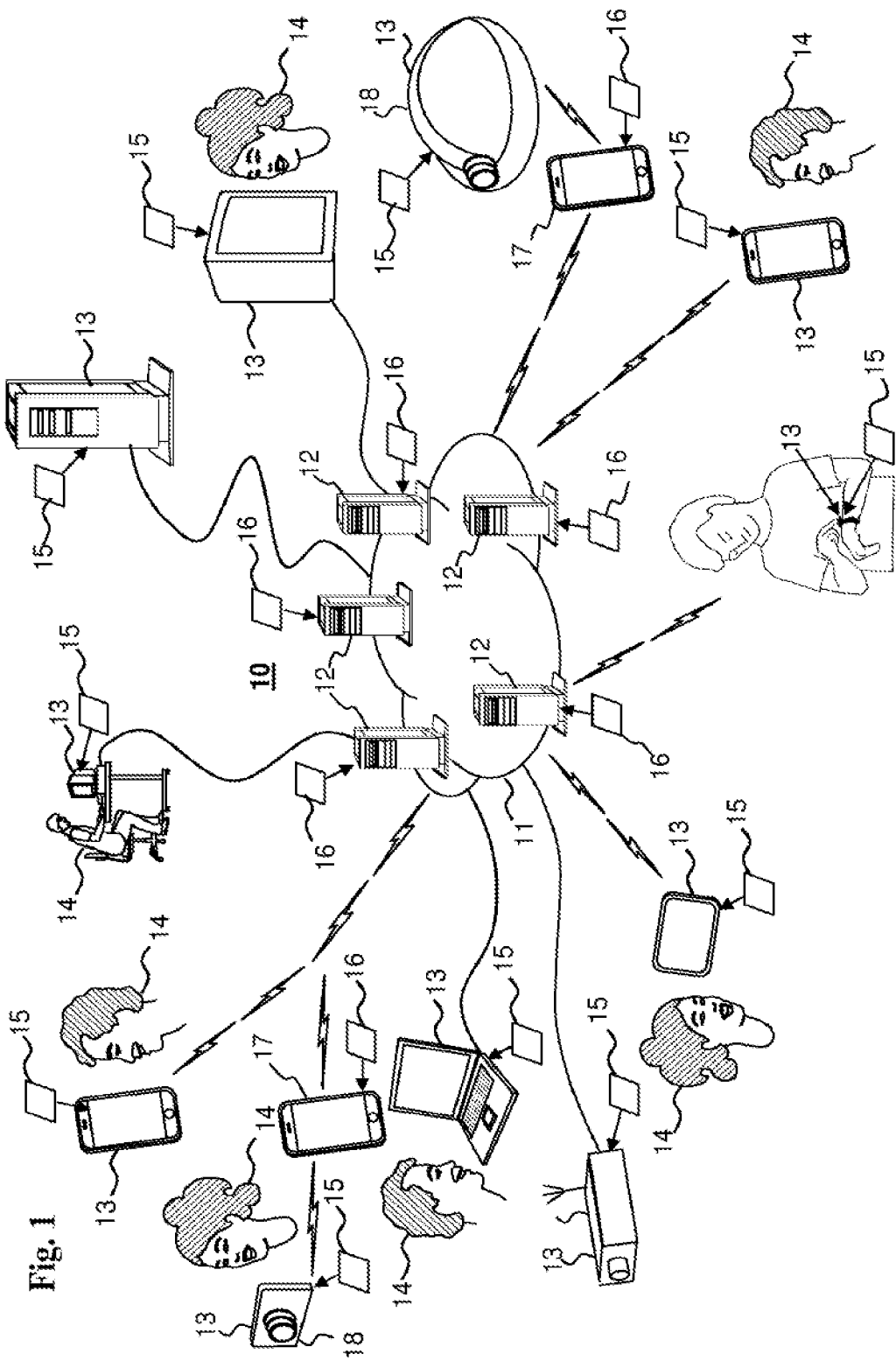
FIG. 1 is a simplified illustration of a multimedia communication system.

Reference will now be made in detail to the disclosed embodiments, examples of which are illustrated in the accompanying drawings.

The present embodiments comprise systems and methods for creating and communicating multimedia. The principles and operation of the devices and methods according to the several exemplary embodiments presented herein may be better understood with reference to the drawings and accompanying description.

Before explaining at least one embodiment in detail, it is to be understood that the embodiments are not limited in their application to the details of construction and the arrangement of the components set forth in the fallowing description or illustrated in the drawings. Other embodiments may be practiced or carried out in various ways. Also, it is to be understood that the phraseology and terminology employed heroin is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different figures may use different scales and different scales can be used even within the same drawing, for example different scales for different views of the same object or different scales for the two adjacent objects.

The purpose of the embodiments is to provide at least one system and/or method for communicating multimedia, and particularly but not exclusively, to affect and/or replace components of multimedia content in real-time.

The term "multimedia" or "multimedia content" may refer to any combination of two or more "media" or content types. Media, or content types, may be sound, speech, image, picture, video, text, graphics, animation, data, metadata, control information, session information, etc.

The term "data," particularly as a content type or medium, may refer to data referencing between elements of different media, such as sync information, such as lip-sync data. The term "data" may also refer to measurement such as location (e.g., GPS data), motion (e.g., accelerometer and/or gyro data), orientation (e.g., gravimeter, gyro, and/or compass data), timing information (e.g., lip-synch), biometric data (e.g., heartbeat rate, skin conductivity), etc.

The term "stream" or "streaming," such as in "streaming content," "streaming information," or "streaming multimedia," may refer to content such as sound and video that each is produced, communicated, and consumed in a fixed or constant rate. A bit rate of the communication network may vary, but it is desirable for each packet of a media stream to arrive at a recipient strictly on time according to the fixed rate of the transmitted medium. According to the exemplary embodiments, several media may be accommodated in an interleaved file, each with its own rate, and it is desirable that packets of each medium arrive (strictly) in time. As the network's bit rate may change, a media type may be altered or may be replaced with another that is compatible with the current bit rate, so that packets arrive (strictly) on time.

The term "synchronization" or "synchronized" refers to temporal reference or correlation between any two or more content types, such as sound accompanying video. For example, lip-synch correlates the movement of the lips of a speaker with the speaker's speech (and vice-versa). Streaming multimedia may involve accurate synchronization between at least some of the components (content types, media) of the stream.

The term "image" in this context refers to any type or technology for creating an imagery data, such as photography, still photography (still image, still picture, or simply picture), video photography, stereo-photography, three-dimensional (3D) imaging, thermal or infra-red (IR) imaging, etc. In this context any such image may be "captured," "obtained," or "photographed."

The term "camera" in this context refers to device of any type or technology for creating one or more images or imagery data such as described herein, including any combination of imaging type or technology, etc.

The term "server" or "communication server" refers to any type of computing machine connected to a communication network facilitating communication between one or more cameras (e.g., a local camera) and one or more remote users and/or remote systems.

The term "network" or "communication network" refers to any type of communication medium, including but not limited to, a fixed (wire, fiber, cable) network, a wireless network, and/or a satellite network, a wide area network (WAN) fixed or wireless, including various types of cellular networks, a local area network (LAN) fixed or wireless, and a personal area network (PAN) fixed or wireless, and any combination thereof.

It is appreciated that the network bandwidth may change with time, therefore affecting the amount of data that can be communicated over a particular leg of the network in a particular transfer rate over a particular period of time. Therefore the content, particularly the streaming content, should be adapted to the network bandwidth for example by changing the compression level, changing the image resolution, removing components or parts of the communicated content and/or data, replacing components or parts of the communicated content and/or data with less demanding content and/or data, etc.

Reference is now made to FIG. 1, which is a simplified illustration of a multimedia communication system 10, according to one exemplary embodiment.

As shown in FIG. 1, multimedia communication system 10 may include a communication network 11 in which one or more multimedia communication servers 12 may be distributed forming a server cloud. Servers 12 may communicate with communication terminals 13, some of which may be operated by users 14. One or more of communication terminals 13 may each create or obtain content and transmit it to one or more other communication terminals 13 that may receive the transmitted content and provide it to their respective users 14. Typically, a transmitter communication terminal 13 may transmit the content to one of servers 12, which may then communicate the content to one or more other servers 12, which may then communicate the content to their respective recipient terminals 13.

It is appreciated that a transmitter communication terminal 13 may become a receiver, and a recipient terminal 13 may become a transmitter. It is appreciated that a server 12 may be regarded as a combination of a receiver and a transmitter, the receiver receiving communications from a transmitter communication terminal 13 and the transmitter transmitting communications to a recipient communication terminal 13. It is appreciated that a server 12 may include any number of such receivers and transmitters.

A communication terminal 13 may be any type of computation device that can create or obtain any type of content, and/or receive and provide to a user any type of content. Content type, or medium, may be sound, speech, image, picture, video, text, graphics, animation, data, metadata, control information, session information, etc. Multimedia content refers to any combination of two or more content types (media). Particularly, synchronously coupled combination of two or more media. For example, a communication terminal 13 may be a desktop computer, a laptop computer, a tablet computer, a mobile communication device such as a cellular telephone or a smartphone, a smart-watch or a wrist-mounted camera, a camera having communication capabilities, a wearable device (e.g. a wrist-mounted camera, a head-mounted camera, a helmet-mounted camera, etc.), glasses with a display and a camera (smart-glasses), a car-mounted camera, etc.

Communication terminals 13 and communication servers 12 may include multimedia communication software. Typically, communication terminals 13 may include client multimedia communication software 15, and communication servers 12 may include server multimedia communication software 16.

Typically, a communication terminal 13, and/or its client multimedia communication software 15, may create or obtain content, open a communication channel to one or more other communication terminals 13 or to a server 12, and transmit the content thereto via the communication channel.

Typically, a communication terminal 13, and/or its client multimedia communication software 15, open a communication channel with one or more other communication terminals 13 or to a server 12, and receive content therefrom via the communication channel.

Typically, a server 12 and/or its server multimedia communication software 16, may open a communication channel with one or more communication terminals 13, typically in response to a request from the communication terminal 13, to receive content from a transmitting communication terminal 13 or another server 12, and/or to transmit content to a recipient communication terminal 13 or another server 12. In a typical channel a first communication terminal 13 creates and transmits content to a first server 12, which transmits the content to one or more other servers 12, which transmits the content to one or more recipient communication terminals 13.

A server of multimedia communication system 10 may take the form of a portable server 17. Portable server 17 may operate in any type of portable computing and/or communication device such as a smartphone. A portable server 17 may operate as a regular server 12 being a part of the server cloud, or in addition to the server cloud, operating as a secondary communication layer, co-located with a content input/output device that does not have long-range communication capabilities. A portable server 17 may be carried by a user or worn by a user (e.g. a wearable computer).

For example, as shown in FIG. 1, a terminal 13 designated by numeral 18 (e.g., a hand-held camera, a helmet-mounted camera, a car mounted camera (not shown), etc.) may communicate with a collocated portable server 17 using a short-range communication network such as Bluetooth, Wi-Fi, etc. The portable server 17 may then communicate with a server 12 via a cellular network. It is appreciated that a portable server 17 may execute both client multimedia communication software 15 and server multimedia communication software 16.

The content transferred between communication terminals 13 and servers 12 is typically considered multimedia content as it may include two or more media. These different media may be of the same content type or of different content types, such as sound, speech, image, picture, video, text, graphics, animation, data, metadata, control information, session information, etc.

Figure 2:
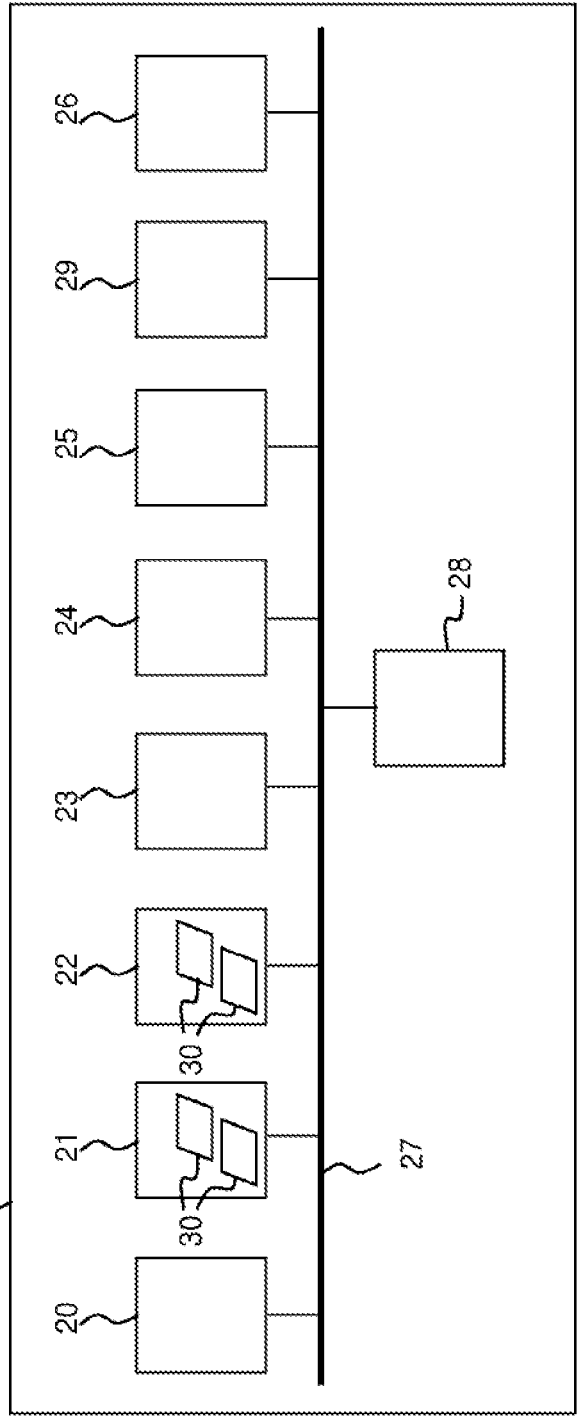
FIG. 2 is a simplified block diagram of a computing device used by the multimedia communication system.

Reference is now made to FIG. 2, which is a simplified block diagram of a computing system 19, according to one exemplary embodiment. As an option, the block diagram of FIG. 2 may be viewed in the context of the details of the previous Figures. Of course, however, the block diagram of FIG. 2 may be viewed in the context of any desired environment. Further, the aforementioned definitions may equally apply to the description below.

The block diagram of computing system 19 may represent a general example of a device used for executing client multimedia communication software 15 and/or server multimedia communication software. 16, or any other type of software program. For that purpose computing system 19 may represent a communication terminal 13 and/or server 12 and/or portable server 17.

The term "computing, system" or "computing device" relates to any type or combination of computing devices, or computing-related units, including, but not limited to, a processing device, a memory device, a storage device, and/or a communication device.

As shown in FIG. 2, computing system 19 may include at least one processor unit 20, one or more memory units 21 (e.g., random access memory (RAM), a non-volatile memory such as a flash memory, etc.), one or more storage units 22 (e.g. including a hard disk drive and/or a removable storage drive, representing a floppy disk drive, a magnetic tape drive, a compact disk drive, a flash memory device, etc.). Computing system 19 may also include one or more communication units 23, one or more graphic processors 24 and displays 25, a variety of user input and output (I/O) devices 26, and one or more communication buses 27 connecting the above units. Computing system 19 may be powered by a power supply 28, which may include a battery.

Computing system 19 may also include an imaging sensor 29 configured to create a still picture, a sequence of still pictures, a video clip or stream, a 3D image, a thermal (e.g., IR) image, stereo-photography, and/or any other type of imaging data and combinations thereof.

Computing system 19 may also include one or more computer programs 30, or computer control logic algorithms, which may be stored in any of the memory units 21 and/or storage units 22. Such computer programs, when executed, enable computing system 19 to perform various functions (e.g. as set forth in the context of FIG. 1, etc.). Memory units 21 and/or storage units 22 and/or any other storage are possible examples of tangible computer-readable media.

Particularly, computer programs 30 may include client multimedia communication software 15 and/or server multimedia communication software 16. Computer programs 30 may also, or alternatively, include transmitter communication software and/or receiver communication software or modules. Computer programs 30 may also, or alternatively, include multimedia file processing software or modules. Any such software or module may be embodied in the form of a hardware module or unit.

Communication units 23 may support one or more types of communication technologies such as short-range communication (e.g., PAN, such as USB, Wi-Fi, Bluetooth, etc.) or long-range communication (e.g., Ethernet, IP, Cellular, WiMAX, etc.), whether wired or wireless. For that matter, computing system 19 and/or communication units 23 may include a subscriber identity module (SIM) or a similar device.

Figure 3:
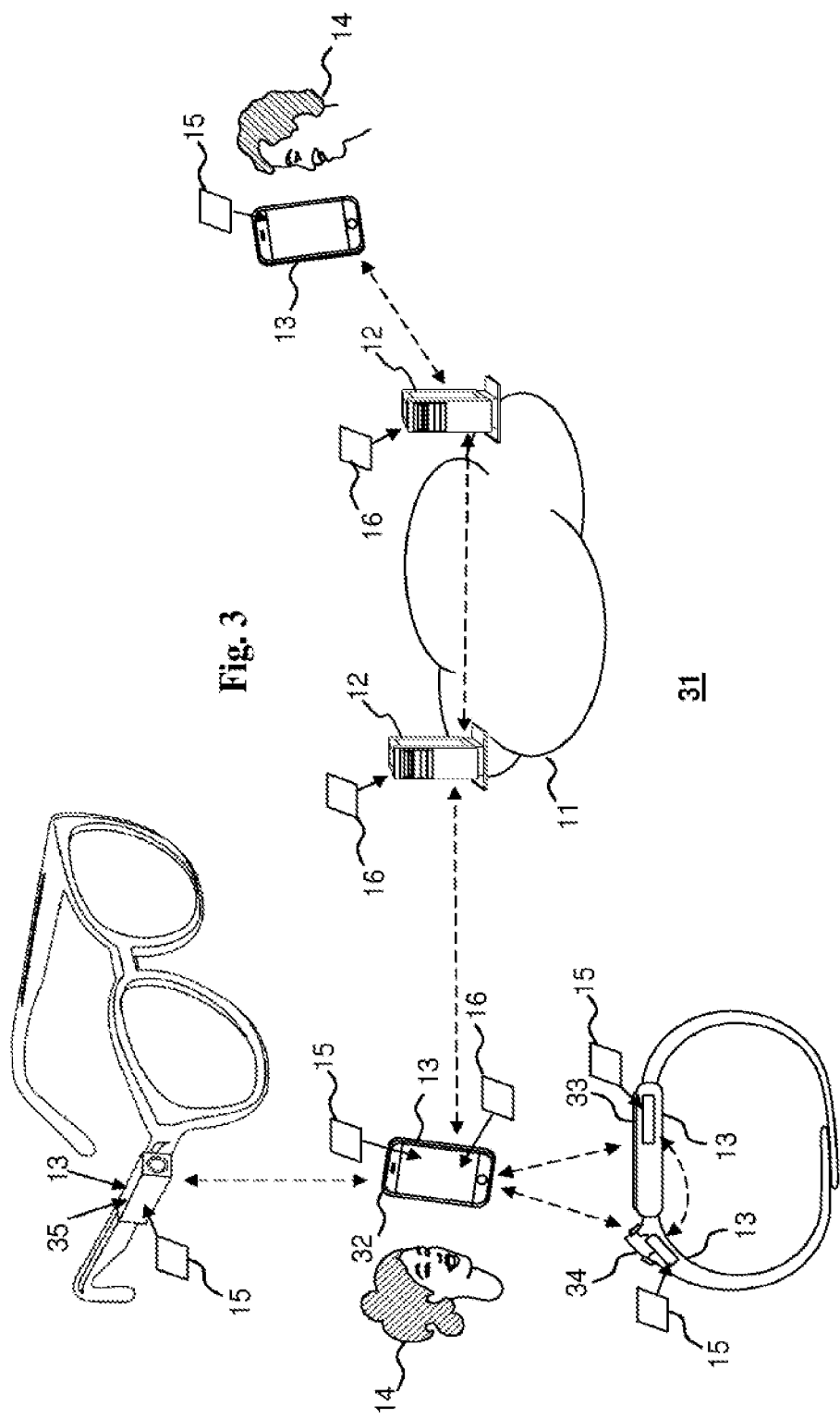
FIG. 3 is a simplified illustration of a communication channel in the multimedia communication system.

Reference is now made to FIG. 3, which is a simplified illustration of a communication channel 31 of multimedia communication system 10, according to one exemplary embodiment.

As an option, the illustration of FIG. 3 may be viewed in the context of the details of the previous Figures. Of course, however, the illustration of FIG. 3 may be viewed in the context of any desired environment. Further, the aforementioned definitions may equally apply to the description below.

As shown n FIG. 3, channel 31 may connect between at least one transmitter communication terminal 13 and at least one recipient communication terminal 13. Both communication terminals may include client multimedia communication software 15. The channel may also include one or more servers, which may include server multimedia communication software 16. Servers 12 may communicate between themselves via a communication network 11. Servers 12 and communication terminals 13 may also communicate between themselves via a communication network such as communication network 11. Typically, servers 12 communicate between themselves over a cable communication network while communication terminals 13 communicate (e.g., with servers 12) over a wireless network (cellular, Wi-Fi, etc.). It is appreciated that any part of the network may be a limited-bandwidth network. The term 'limited-bandwidth network' may refer to a network having limited bit-rate, high latency, high jitter, etc.

As shown in FIG. 3, at least one of the communication terminals 13 (whether the transmitting terminal or the recipient terminal) may also operate as a portable server 32, typically by using server multimedia communication software 16. Portable server 32 may communicate with devices that serve as user peripheral input/output devices, such as wearable computing devices.

For example, a communication terminal 13 operating as a portable server 32 may be a smartphone, which may communicate with a smart-watch 33 with a wrist-band-mounted camera 34, or with a camera and display embedded in eyeglasses 35 (smart-glasses), etc. Such peripheral and/or wearable devices may be regarded as communication terminals 13 too, and may be executing client multimedia communication software 15. Portable server 32 and the peripheral devices may be communicatively coupled over a short-distance network such as Wi-Fi, Bluetooth, etc.

Figure 4:
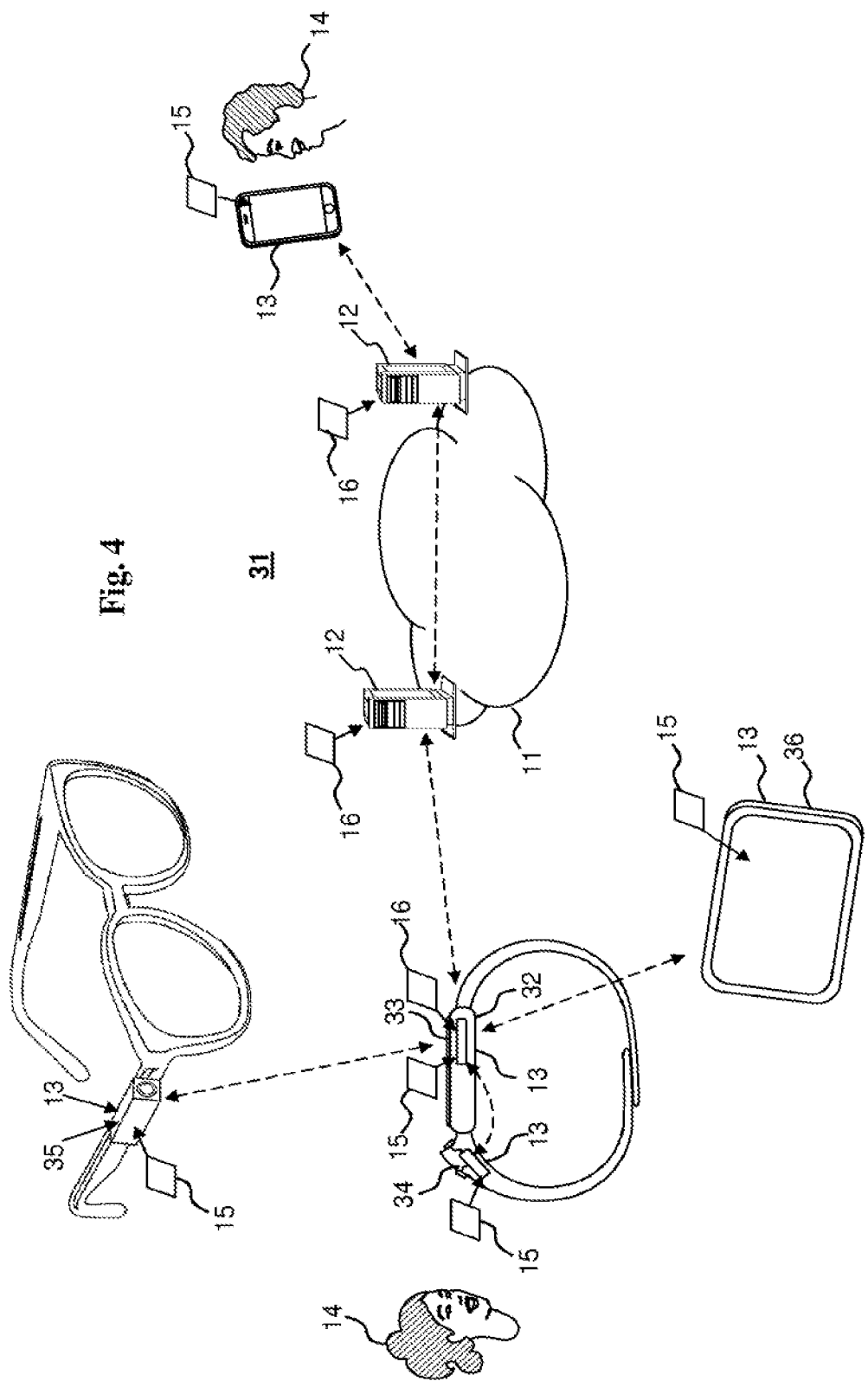
FIG. 4 is a simplified illustration of another variation of a communication channel of the multimedia communication system.

Reference is now made to FIG. 4, which is a simplified illustration of another variation of communication channel 31 of multimedia communication system 10, according to one exemplary embodiment.

As an option, the illustration of FIG. 4 may be viewed in the context of the details of the previous Figures. Of course, however, the illustration of FIG. 4 may be viewed in the context of any desired environment. Further, the aforementioned definitions may equally apply to the description below.

As shown in FIG. 4 the smart-watch 33 may include a SIM card and communicate directly with server 12, for example by using a cellular network. The smart-watch 33 may then operate as a portable server 32 communicating with peripheral devices such as wrist-mounted camera 34, eyeglasses 35 and tablet computer 36.

The communication terminals 13 of FIGS. 1, 3 and 4 may have any type and number of user input/output devices such as keyboard, microphone, speaker, display, touch-sensitive display, camera, etc.

Figure 5:
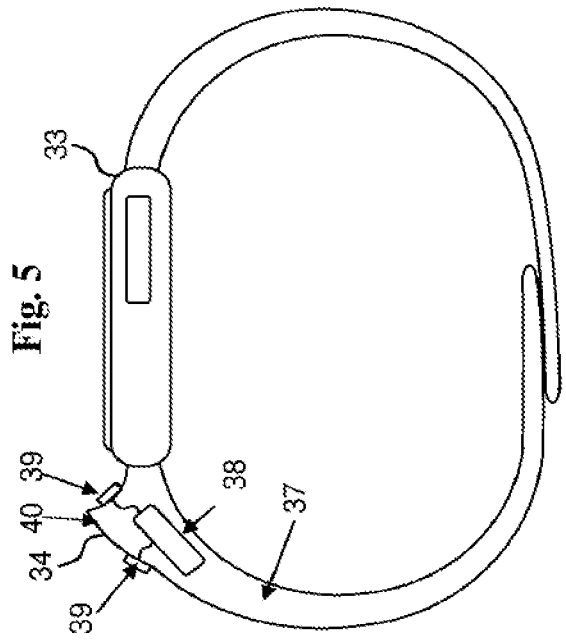
FIG. 5 is an enlarged illustration of a smartwatch and a wristband-mounted camera.

Reference is now made to FIG. 5, which is an enlarged illustration of the smartwatch 33 and wristband-mounted camera 34 of FIGS. 3 and 4, according to one exemplary embodiment.

As an option, the smartwatch 33 and the wristband-mounted camera 34 of FIG. 5 may be viewed in the context of the details of the previous Figures. Of course, however, the smartwatch 33 and wristband-mounted camera 34 of FIG. 5 may be viewed in the context of any desired environment. Further, the aforementioned definitions may equally apply to the description below.

As shown in FIG. 5, a wristband 37 may include electronic circuitry 38, such as shown and described with reference to FIG. 2 and one or more cameras 39 embedded in wristband 37.

As shown in FIG. 5, two cameras are mounted on wristband 37. As an example, the two cameras 39 are mounted on the same side of wristband 37. As an example, wristband 37 includes a bulge 40 and at least one camera 39 is mounted on the bulge 40. As an example, the two cameras 39 are mounted with an obtuse angle between them.

The use of two cameras is known and common with smartphones. However, in smartphones the two cameras are mounted on the two opposing sides of the smartphone, at a straight angle (180 degrees) to enable the user to look straight at the display when capturing a picture using the outbound camera or the inbound (selfie) camera. However, when using a wrist-mounted camera, the user may look down on the display worn on the wrist, such as the display of a smartwatch. Therefore the outbound camera or the inbound (selfie) camera should be mounted at an obtuse angle.

Wristband 37, and or electronic circuitry 38 may also include other measuring devices such as location measuring devices, motion measuring devices, orientation measuring devices, biometric measuring devices, etc. A location measuring device may use a GPS (global positioning system) device. A motion measuring device may use an accelerometer or gyro. An orientation device may use a gravimeter (e.g., an accelerometer), a gyro, a compass, etc. A biometric measuring device may measure heartbeat rate, skin conductivity, etc.

As shown in FIG. 1, and as described above with reference to FIGS. 1, 3 and 4, multimedia communication system 10 may communicate a plurality of media over a communication network, by obtaining the plurality of media by a transmitter terminal communicatively coupled to the communication network, and transmitting a single data stream from the transmitter terminal to a recipient terminal communicatively coupled to the communication network. The transmission may optionally use one or more servers and/or portable servers. The plurality of media are synchronously multiplexed by the transmitter terminal over the single data stream. The recipient terminal may then separate the single data stream into the plurality of synchronized media.

Figure 6:
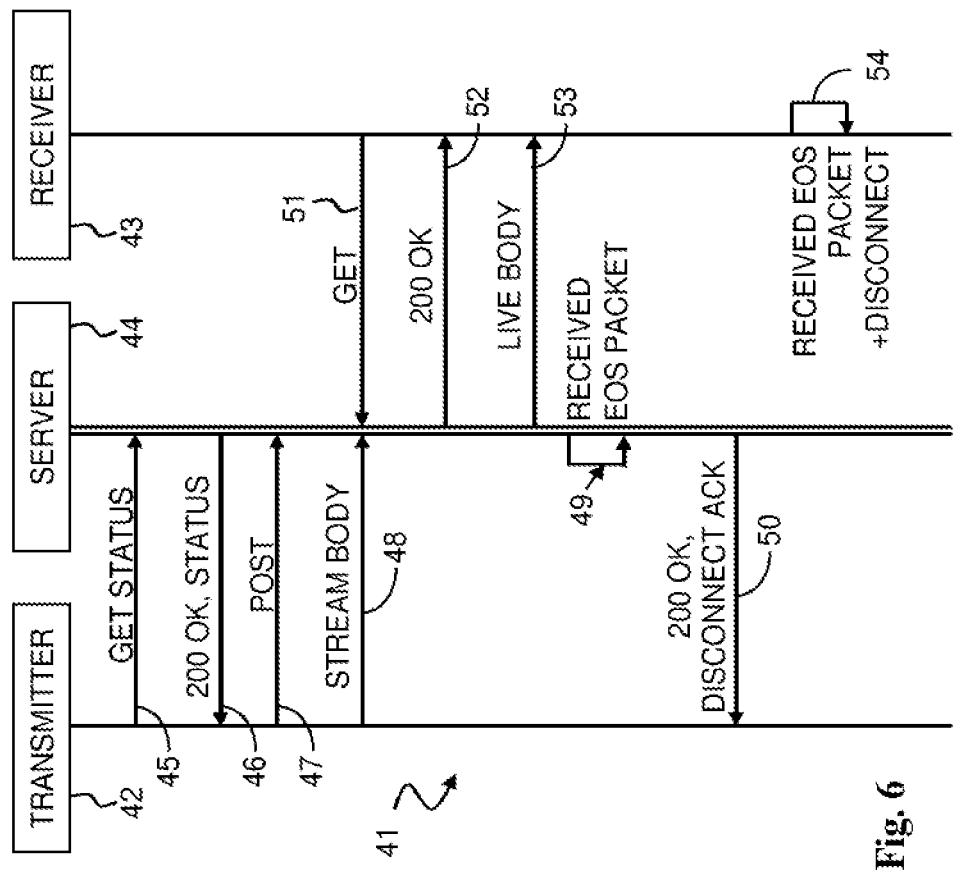
FIG. 6 is a simplified sequence-diagram of a communication session.

Reference is now made to FIG. 6, which is a simplified sequence-diagram 41 of a communication session, according to one exemplary embodiment.

As an option, the sequence-diagram of FIG. 6 may be viewed in the context of the details of the previous Figures. Of course, however, the sequence-diagram of FIG. 6 may be viewed in the context of any desired environment. Further, the aforementioned definitions may equally apply to the description below.

As shown in FIG. 6, sequence diagram 41 is an example of a communication session between a transmitter communication terminal 42, and a recipient communication terminal 43, via a server 44. It is appreciated that server 44 represents any number of cloud servers and/or portable servers.

As shown in FIG. 6, transmitter 42 may initiate a communication session by opening a communication channel with server 44 (steps 45, 46 and 47) and then sending a stream file (step 48), ended by an end-of-session or end-of-file signal (step 49), after which the session is terminated (step 50) at the transmitter's side. Here, server 44 operates as a receiver, and particularly as a first receiver.

In a separate process (not shown in FIG. 6), transmitter 42 may obtain from server 44 a unique content identifier, or a token for a content item, such as a universal resource identifier (URI). When initiating the session, transmitter 42 may present the content identifier or a token to server 44 to identify the stream body communicated in step 48.

In a separate process (not shown in FIG. 6), transmitter 42 may communicate to recipient 43 the content identifier or token. Transmitter 42 may communicate the content identifier or a token to recipient 43 via server 44 or via a different type of server (e.g., an administration server). Transmitter 42 may communicate the content identifier or a token to recipient 43 at any time. For example, transmitter 42 may communicate the content identifier or a token to recipient 43 any time before step 45, anytime between step 45 and step 50, and any time after step 50.

As shown in FIG. 6, receiver 43 may respond to the communication session initiated by the transmitter 42 by opening a communication channel with server 44 (steps 51, and 52) and then receiving a stream file (step 53), ended by an end-of-session or end-of-file signal (step 54), after which the session is terminated at the receiver's side.

Receiver 43 may identify the required stream file by presenting to server 44 (e.g., in step 51) the content identifier or token received from transmitter 42. Receiver 43 may present the content identifier or token to server 44 any time after it is received, whether before step 45, between step 45 and step 48, with step 48, after step 48, and/or after step 54. Here, server 44 operates as a transmitter, and particularly as a second transmitter, while receiver 43 may be considered a second receiver.

Obviously, if receiver 43 presents the content identifier or token to server 44 before step 48 the streaming (step 53) may start as soon as streaming starts at the transmitter side (step 48).

It is appreciated that the multimedia content transmitted in step 48, and the multimedia content received in step 53 may include a plurality of media. Particularly, the stream communicated in steps 48 and 53 may include at least one data element describing a plurality of media comprising the single data stream, and a plurality of data elements identifying a particular data stream element including particular medium, where the data stream elements of different media of the plurality of media in the single data stream are synchronized with each other.

It is appreciated that the multimedia contort communicated in step 53 may be different from the multimedia content communicated in step 48 by least one of the media included in the multimedia content being converted. Such converted media may be converted to another form or format of the same medium type, such as a different frame rate, or resolution, or compression rate. Alternatively, such converted media may be converted to another medium type such as from speech to text, or from video to animation, etc. However, it is appreciated that the data stream elements of converted medium or media may retain synchronization with each other as well as with unconverted media elements.

Step 45 may include or function similarly, for example, as an HTTP command such as GET typically including a path identifier for a serve to serve the relevant request, and a unique identifier for the stream body file of step 48.

Step 46 may include or function similarly, for example, as an HTTP command such as 200 OK optionally denoting a particular medium type (e.g., video, audio, picture, text, etc.) and optionally a sequence number or a time stamp indicating the last data element received for the particular unique identifier.

Step 47 may include or function similarly, for example, as an HTTP command such as POST typically including a path identifier for a server to serve the relevant request, and a unique identifier for the stream body file of step 48. The command of step 47 may also include a name of a particular parameter and a value of that parameter indicating, for example:

Rotation value of a visual element.
Horizontal flip of a visual element, enabled or disabled.
Vertical flip of a visual element, enabled or disabled.
Client version identifier.
The width of a visual element.
The height of a visual element.
Video bitrate in Kb.
Audio bitrate in Kb.
Initial video codec used.
Initial audio codec used.
The initial frames-per-second value of a video stream or picture.
The initial sampling rate of an audio track.
The initial audio track channel number.
A single session subtype number indicating that there will be only one track.
The time (e.g., the number of seconds, or milliseconds) from the initiation of the recording until the initiation of the transmission.
The device unique identifier.
Operating system type.

Step 50 may include or function similarly, for example, as an HTTP command such as Disconnect Acknowledged such as 200 OK.

Step 51 may include or function similarly, for example, as an HTTP command such as GET typically including a path identifier for a server to serve the relevant request, and a unique identifier for the live body file of step 53.

It is appreciated that the unique identifier of step 51 may be identical to the unique identifier of step 45. However, the live body file of step 53 may differ from the stream body file of step 48 by one or more data elements extracted, inserted, and/or converted by server 44.

The command of step 51 may include a parameter, which value may indicate, for example:

The length of the file previously received for the particular unique identifier (in a previous step 53).
The device unique identifier.
Operating system type.
Optimize stream content for bandwidth on/off.

Figure 7:
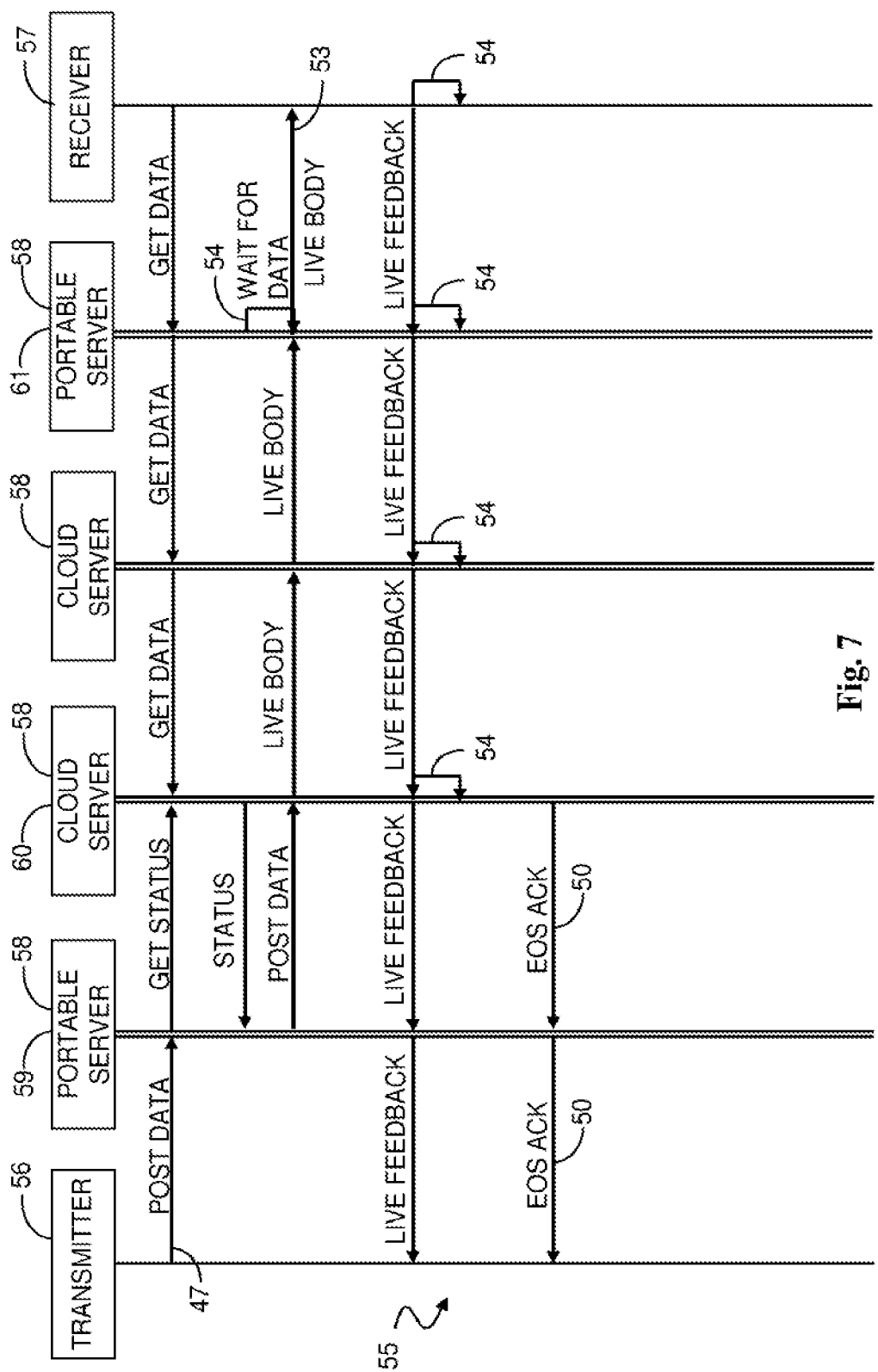
FIG. 7 is a simplified sequence diagram of a communication session between a transmitter communication terminal, and a recipient communication terminal, via a plurality of servers.

Reference is now made to FIG. 7, which is a simplified sequence diagram 55 of a communication session between a transmitter communication terminal 56, and a recipient communication terminal 57, via a plurality of servers 58, according to one exemplary embodiment.

As an option, the sequence diagram of FIG. 7 may be viewed in the context of the details of the previous Figures. Of course, however, the sequence diagram of FIG. 7 may be viewed in the context of any desired environment. Further, the aforementioned definitions may equally apply to the description below.

The number of servers 58 shown in FIG. 7 is arbitrary, and the type of the servers is also arbitrary. A session such as shown in FIG. 7 may transverse any number of servers, and the number of servers may change during the session. The same applies to the type of the server, which may change during the session. As an example, FIG. 7 shows two types of servers, cloud servers (such as servers 12 of FIG. 1), and portable servers (such as server 17 of FIG. 1, and/or server 32 of FIGS. 3 and/or 4). As an example, FIG. 7 shows two cloud servers and a portable server for both the transmitter and the receiver. However, any other combination of servers is possible and contemplated. It is appreciated that transmitter 56 and/or recipient 57, as well as their respective portable servers, may access their nearest cloud servers, or the cloud servers providing better communication performance e.g., higher bandwidth).

As shown in FIG. 7, transmitter 56 may initiate a session by contacting its portable server 59, which then contacts a cloud server 60. The session with cloud server 60 is based on a unique content identifier obtained from any cloud server 58 in an earlier process (not shown in FIG. 7), as shown and described with reference to FIG. 6.

In a separate process (not shown in FIG. 7), transmitter 56 and its portable server 59 may communicate the content identifier or token to recipient 57 or to the portable server 61 associated with recipient 57. Recipient 57 (or its portable server 61), using the content identifier or token, may then access cloud server 60, via any chain of servers 58. However, to reduce latency, cloud server 60 may anticipate the distribution of recipients and forward multimedia data associated with the content identifier to various cloud servers ins advance of the recipient's requests.

It is appreciated that while a receiver and/or a transmitter may be limited to half-duplex like communication in the sense that a transmitter cannot display received data while it is recording data (and vice versa), a portable server may receive and transmit at the same time. Therefore, a receiver may initiate "live feedback" streaming transmission while its portable server is receiving streaming data, e.g., "live body," (and vice versa).

It is appreciated that a client device that may be operating as a transmitter and/or a receiver, as well as an input device and/or and output device, may maintain a connection with its respective portable server at all times, including time in which no data is exchanged.

The term "live feedback" may refer to any type of content created by the recipient user or by the recipient device (also automatically) while receiving the "live body" streaming content. The "live feedback" may include one or more types of content, and may include types of content that are different from the types of content of the "live body." For example, the "live body" may include video and audio and the "live feedback" may include text, a picture, and/or graphics.

Typically, the "live feedback" may not require an independent content identifier, may not create an independent session, and may not create an independent streaming multimedia file. Instead the "live feedback" may "ride upon" the "live body" streaming multimedia file as an annex layer.

"Live feedback" layers may be produced during live transmission of the "live body." In this context the term "live transmission" may refer to the transmission of the "live body" while it is created, that is, before the creation of the "live body" is completed. However, alternatively, live feedback layers may be also be produced when the "live body" streaming multimedia file is retrieved, after the creation of the "live body" is completed.

"Live feedback" layers may be produced by any number of recipients (users and/or devices). In one embodiment, the original creator/sender of the "live body" streaming multimedia file may determine which of the "live feedback" to see, and/or which of the "live feedback" to distribute to other recipients.

Therefore, the "live feedback" content is stored as part of the "live body" streaming multimedia file, however, it may be separately identified so that any such layer can be included or removed according to user selection.

Figure 8:
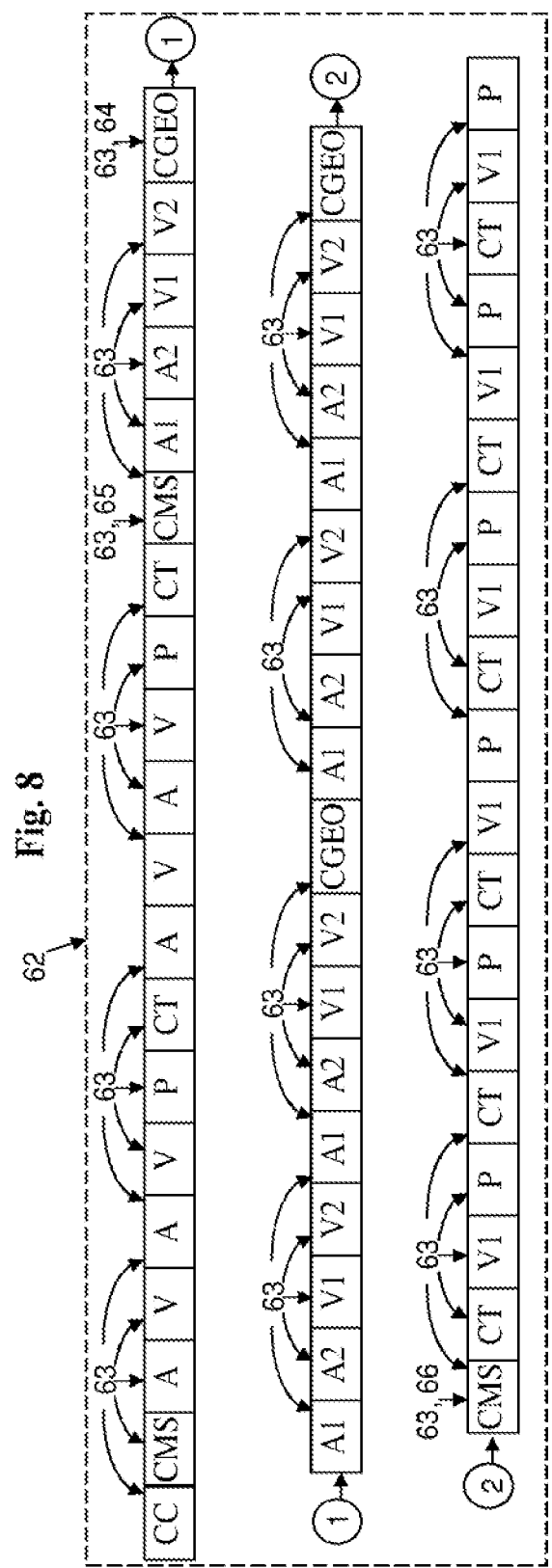
FIG. 8 is a simplified block diagram of a streaming multimedia file.

Reference is now made to FIG. 8, which is a simplified block diagram of streaming multimedia 62, according to one exemplary embodiment.

As an option, the block diagram of FIG. 8 may be viewed in the context of the details of the previous Figures. Of course, however, the block diagram of FIG. 8 may be viewed in the context of any desired environment. Further, the aforementioned definitions may equally apply to the description below.

The term "streaming multimedia" may refer, for example, to the stream file (i.e. "stream body") sent by the transmitter 42 to the server 44 in step 48 of FIG. 6, and/or to the stream file (i.e. "live body") sent by the server 44 to the receiver 43 in step 53 of FIG. 6. The block diagram of FIG. 8 may be regarded as a description of the structure of data elements 63 of streaming multimedia 62 sent over time from a transmitter to a receiver, where the right element 63 follows the left element 63 in time. The elements of the streaming multimedia 62 are ordered by time from left (early) to right (later), and top line to bottom.

Streaming multimedia 62 as described hereto may be carried by any type of communication technology, for example as, or within, the application layer of an ISO OSI networking model. For example, streaming multimedia 62 may be communicated over the Internet protocol (IP), for example using TCP, UDP and/or RTP. For example, the streaming multimedia 62 of FIG. 8 may support RTP over TCP.

As shown in FIG. 8, streaming multimedia 62 may include a plurality of elements 63 including control information, data, and various types of media according to a communication protocol of the exemplary embodiments. In some embodiments, the communication protocol corresponds to the interleaved content elements, which may appear in any order and combination. In some embodiments, the communication protocol is also based on control information, such as the CC and CMS elements (described below) that defines the types (e.g., possible combination) of the content elements that follow the control information. A data element 63 may be embodied, for example, as a communication packet, such as in a packet switching communication technology. In the example of FIG. 8, such elements 63 may be designated types of control information, data, and media:

"CC" designates a Configuration Control packet describing the stream.

"CMS" designates a Media Shift Control packet specifying continuing tracks.

"A" designates an Audio data packet.

"V" designates a Video data packet.

"P" designates a Picture packet.

"CT" designates a Control Text packet.

"CGEO" designates a Control Geolocation packet.

"A1" and "A2" may designate two different audio channels, such as a stereo sound. "V1" and "V2" may designate two different video channels, for example from two cameras, such as a stereoscopic camera or a forward looking camera and a backward looking (selfie) camera of a smartphone, smartwatch, and/or wrist-mounted camera as shown and described with reference to FIG. 5. Other types of media are possible, such as graphics, and animation. CGEO 64 is an example of a data packet carrying any type of data such as measurements derived from sensors such as GPS, accelerometer, gyro, gravimeter, compass, biometric data, timing information (e.g., lip-synch), meta-data, etc.

"CC" and "CMS" are examples of types of control packets, typically containing control information. "CC" or Configuration Control packet is a data element 63 typically including a description of the types of media elements in a stream. Typically, a CC element is provided as a header of a session, such as "stream body" of step 48 and/or "live body" of step 53 of FIG. 6. A CMS element may then be used to remove, add, change, and/or replace types of media elements following the CMS element.

In the example of streaming multimedia 62 as shown in FIG. 8, streaming multimedia 62 includes an audio stream A, a video stream V, a plurality of pictures P and a plurality of textual components CT. The textual components may be, for example, messages (e.g., as in instant messaging), subtitles, comments, etc. The various elements 63 may be correlated, and/or synchronized. The various elements 63 may be correlated, and/or synchronized in time and/or in space.

For example, the audio and the video streams are correlated so that they can be provided to a user in a synchronized manner. The textual components may be correlated with the video or picture elements so that they can be displayed to a user over the correct image.

The CMS element designated by numeral 65 adds, for example, a second audio stream A2 and a second video stream V2 to the streaming multimedia 62, as well as location data CGEO.

It is appreciated that streaming multimedia 62 may be stored or transmitted as a single multimedia content file including any combination of content types, and/or any combination of media streams, and/or any number of content types, and/or media streams. The particular combination, or configuration, of media streams, and/or content types, is typically designated by the CC element and can be modified by the CMS element. The media streams, and/or content types are then multiplexed within the streaming multimedia content 62 as a sequence of elements 63.

An element 63 may include a header part and a payload part. The header part may contain parameters such as source ID, type indicator, timing stamp, sequence number, payload quantity, etc.

The source ID may uniquely identify the device originating, creating, and/or producing the data or content contained in the payload part.

The type indicator may indicate the type of the data or content contained in the payload part, such as audio, video, picture, control, etc.

The timing stamp may indicate the time of creation of the particular element. The timing stamp may be absolute (e.g., GMT) or relative. Relative time stamp may refer to the beginning of the multimedia file 62, or relative to the beginning of the particular stream (e.g., A1, V2, etc.) within the multimedia file, or relative to the last (most recent) CC or CMS element, etc.

The sequence number may indicate the number of the particular element with respect to the beginning of the particular stream (e.g., the stream of A1 elements, the stream of V2 elements, etc.) within the multimedia file, or relative to the last (most recent) CC or CMS element, etc.

The payload quantity may indicate how much payload is contained in the payload part, for example, in bits, bytes, seconds, etc. The payload part may contain data and/or content typically pertinent to the type indicated in the header part. The payload quantity, and/or the size of the payload part, may be variable. In this respect, each type of medium, and/or each medium stream within the multimedia file 62, may have a different and/or particular size of payload part. However, typically, or optionally, elements of a particular type may have the same payload size following a particular CMS element (or between CMS elements).

It is appreciated that the structure of the multimedia file 62, as well as the structure of the elements 63, enable efficient random access to each and any element 63 within the multimedia file 62. Particularly the structure of the multimedia file 62, as well as the structure of the elements 63, enable efficient direct access to each and any element 63 within each medium stream, or medium type, within the multimedia file 62. For example, it is possible to access particular elements 63 of a particular medium stream, or medium type without having to read all the elements 63 preceding the target element 63, or even the elements 63 preceding the target element 63 within a particular medium type or stream.

It is appreciated that each streaming element 63 within the multimedia file 62 may arrive at the receiver strictly in time. The interleaved multimedia file 62 may accommodate several media, each with its own (streaming) rate. The protocol of multimedia file 62 enables element 63 of each medium to arrive (strictly) in time according to the streaming rate of the particular medium. In some embodiments, as the network's bit-rate may change, one or more media types of the multimedia file 62 may be replaced with another medium type that is compatible with the current bit rate, enabling element 63 to arrive (strictly) on time.

It is appreciated that the various elements of the streaming multimedia 62 may be tightly and/or accurately correlated and/or synchronized as described above, independently of the particular configuration of streaming multimedia 62. In that respect, any combination and/or number of types carried by streaming multimedia 62 may be tightly and/or accurately correlated and/or synchronized.

The structure of the multimedia file 62 and its elements 63 may further enable a consolidated clock, or timing, or synchronization of the various media streams and their elements 63, with respect to the consolidated clock. The consolidated clock is typically provided at the origin, such as by the original transmitter and/or the source devices. Therefore the consolidated clock of a particular multimedia file 62 consolidates the clocks of the various source devices into a single, synchronized multimedia file 62. Therefore, media streams may be extracted and/or added to the multimedia file 62 by consolidating their respective clocks to the consolidated clock of the multimedia file 62.

It is appreciated that the content, or the structure, or the configuration, of streaming multimedia 62 may be altered without closing the file, without initiating the transfer of a new file, and without affecting the correlation and/or synchronization between elements of streaming multimedia 62. A content type may be extracted, removed, added, changed and/or replaced while preserving the correlation and/or synchronization between the elements of streaming multimedia 62.

Therefore, a receiver such as recipient communication terminal 13, and/or server 12, may receive a single data stream such as streaming multimedia 62, and extract any number of elements 63 of any selected medium. Therefore, such receiver may separate (e.g., demultiplex) the single data stream into a plurality of media, while preserving the correlation and/or synchronization between the elements 63 of streaming multimedia 62.

A receiver, and/or a transmitter, and/or a communication terminal 13 and/or server 12, may include a module or a unit (comprising hardware and/or software) such as a streaming file processing module or unit that is capable of processing a streaming multimedia file by, for example, extracting, adding, converting, etc. at least one element 63 of the streaming multimedia file according to a communication protocol of the exemplary embodiments.

Hence, a transmitter such as transmitter communication terminals 13 and/or server 12, may change the configuration (or combination) of media types within a streaming multimedia 62 in real-time, while streaming multimedia 62 is being communicated, for example by inserting a CMS element. A CMS element may add, remove or replace one or more media types following the CMS element. Any number of such CMS elements can be used. While the CMS element may change the configuration of the streaming multimedia 62, the synchronization between old and new elements 63 is preserved.

For example, as shown in FIG. 8, a first CMS configures streaming multimedia 62 to carry an audio channel A, a video channel V, pictures P and text T. The second CMS designated by numeral 65 changes the configuration by adding a second audio channel, a second video channel, and geolocation data. A third CMS designated by numeral 66 changes the configuration of streaming multimedia 62 by removing the audio channels and the second video channel, inserting a text channel (for example replacing the audio channels) and inserting a sequence of pictures (for example replacing the video channels).

It is therefore appreciated that the structure of the multimedia file 62 and its elements 63 may further enable a server to communicate to any other server or a recipient terminal to provide to a user, any part of the multimedia file 62, from any point within the multimedia file 62, whether a single stream a combination of streams. Such part of the multimedia file 62 may be communicated or provided immediately, or with low latency, preserving the original structure and/or format of the file or stream. In this respect, if an element 63 is lost, and/or delayed and/or corrupted, only the particular missing element 63 is omitted from the data further communicated and/or provided to a user.

The multimedia file 62 and its elements 63 may further enable a server and/or a recipient terminal to reconstruct the synchronization between elements 63 of the same stream and/or different streams even if some parts of the multimedia file 62 are missing, or cut out, or if the multimedia file 62 is communicated from any arbitrary point of the original multimedia file 62.

For example, a multimedia file 62 may be transmitted or retrieved from an arbitrary point by adding a CC element 63 in the beginning, where the CC element is adapted to types of the immediately following content-bearing elements 63. Thereafter, adding a CMS element 63 may add a new type of content for the following content-bearing elements 63. Typically, the CC may be identified with each originating transmitter device (e.g., a device creating a multimedia file) and vice-versa (a particular originating device may have a particular constant CC). Therefore, if the originating device of a particular multimedia file is known, the CC is also known, and may be added ahead of any part of the particular multimedia file.

Returning to FIG. 3, portable server 32 may receive streaming multimedia 62 created by a remote communication terminals 13 and communicated via one or more servers 12. Portable server 32 may then provide the contents of the streaming multimedia 62 to the user 14 using any combination of the output devices available (e.g., smartphone, smartwatch, and smart-glasses), while preserving the correlation and/or synchronization between the elements 63 of streaming multimedia 62.

Similarly, portable server 32 may collect various content streams and/or data (e.g., from the smartphone, smartwatch, and smart-glasses), create streaming multimedia 62, and communicate the streaming multimedia 62 via one or more servers 12 to any number of recipient communication terminals. Portable server 32 may multiplex the collected contents or data over the streaming multimedia 62 in real-time, thus preserving the correlation and/or synchronization between the elements 63 of streaming multimedia 62.

Figure 9:
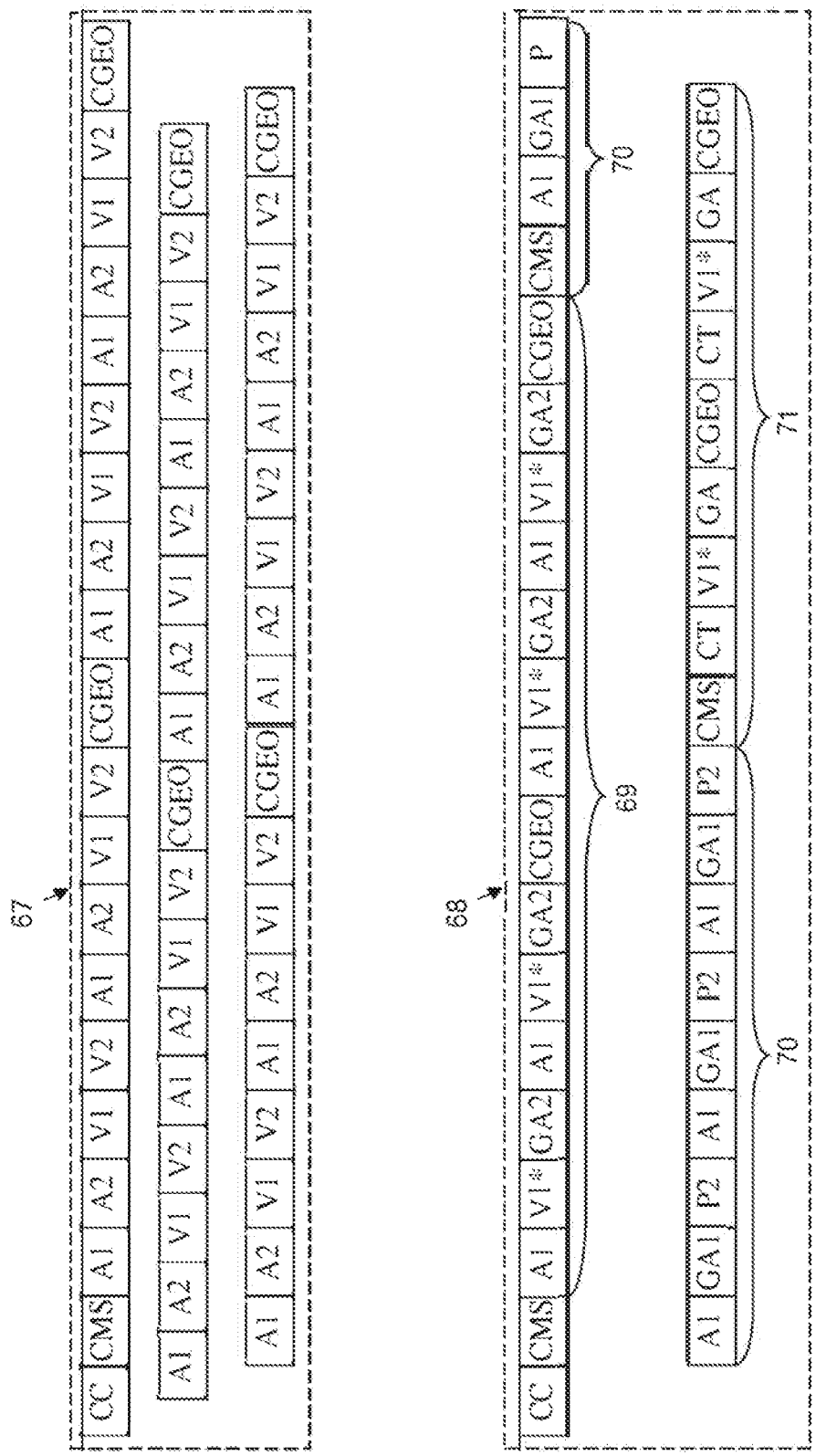
FIG. 9 is simplified block diagrams of an input streaming multimedia file, and a corresponding output streaming multimedia file.

Reference is now made to FIG. 9, which illustrates simplified block diagrams of an input streaming multimedia 67, and a corresponding output streaming multimedia 68, according to one exemplary embodiment. Input streaming multimedia 67 may be a streaming file received by a server while output streaming multimedia 68 may be a streaming file transmitted by the server, corresponding to input streaming multimedia 67.

As an option, the block diagrams of FIG. 9 may be viewed in the context of the details of the previous Figures. Of course, however, the block diagrams of FIG. 9 may be viewed in the context of any desired environment. Further, the aforementioned definitions may equally apply to the description below.

A server in this respect is a computational entity in air intermediary location in the network that is capable of receiving and transmitting streaming multimedia such as streaming multimedia 62 of FIG. 8. For example, the server may be server 12 of FIGS. 1, 3, and 4, or portable server 17 of FIG. 1, or portable server 32 of FIG. 3, or portable server 32 or FIG. 4. A server may receive input streaming multimedia 67 from a transmitter communication terminal 13, or from another server (e.g., server 12, or portable server 17 or 32), and transmit output streaming multimedia 68 to one or more recipient communication terminals 13, or to another server (e.g., server 12, or portable server 17 or 32). The elements of streams 67 and 68 are ordered by time from left (early) to right (later), and top line to bottom.

As shown in FIG. 9, input streaming multimedia 67 and/or output streaming multimedia 68 may include a stream of elements such as elements 63 of FIG. 8 starting with a CC and CMS elements and then a multiplexed combination of a variety of media streams such as audio channels A1, A2, video channels V1, V2, pictures P, text, graphics, animation etc., as well as various data elements as disclosed above.

In the example shown in FIG. 9, input streaming multimedia 67 includes a continuous and consistent repetition of two audio channels (A1 and A2), two video channels (V1 and V2), and a geolocation control element every three repetitions of the audio and video channels.

In the example shown in FIG. 9, the server adapts output streaming multimedia 68 to the conditions downstream. For example, the server may detect and/or determine that the bandwidth available downstream is too low to communicate input streaming multimedia 67 in real-time. Therefore, the server may reduce the amount of data, or bitrate, communicated by output streaming multimedia 68. In a first exemplary sequence 69 the server removes A1, extracts V1 and replaces it with a reduced bitrate version V1*, extracts V2 and converts it into a graphic animation GA2. V1* may include a higher compression rate of V1, or reduced color depth, or reduced resolution, etc.

In a second exemplary sequence 70 the server may detect and/or determine that the recipient communication terminal lacks computing or provisioning (e.g. output devices) capabilities. For example, server may detect and/or determine that the recipient communication terminal cannot provide real-time video. Therefore the server may extract V1 and convert it into a graphic animation GA1, and extract V2 and replace it with one or more still pictures P2.

In a third exemplary sequence 71 the server may detect and/or determine that the environment of the recipient communication terminal is inadequate for a particular medium. For example, a noisy environment may be inadequate for audio, and direct sunlight may be inadequate for visual display. For example, server may detect and/or determine that the environment of the recipient communication terminal is noisy and therefore the server may extract the audio channel A and convert it into textual display CT. Alternatively, a recipient user having a hearing loss may request such conversion.

It is appreciated that in the examples herein, where a server determines or detects any particular situation, the server may detect such situation directly, or indirectly via the recipient terminal. In such case the recipient terminal may report such particular situation to the server, and/or implicitly request a particular modification of the communicated multimedia file.

It is appreciated that in the examples of sequences 69, 70 and 71 the elements of output streaming multimedia 68 are synchronized, and/or correlated, to each other in the same manner in which the corresponding elements of input streaming multimedia 67 are synchronized, and/or correlated, to each other. Particularly, for example, the replaced, and/or converted, and/or inserted elements (e.g., V1*, GA1, GA2, P2, etc.) are synchronized, and/or correlated, to the other elements of the corresponding sequences, in the same manner in which the corresponding original elements are synchronized, and/or correlated, to each other.

A streaming file processing module or unit of a receiver, and/or a transmitter, and/or a communication terminal 13 and/or server 12, may process a single data stream based on a communication protocol of the exemplary embodiments, by, for example, extracting, adding, converting, etc. at least one element of the single data stream.

Therefore, the communication protocol of a single data stream, as shown and described by streaming multimedia 62 of FIG. 8 and streaming multimedia 67 and 68 of FIG. 9, may enable a transmitter (such as a server) to extract at least one data stream element of a selected medium from the plurality of media of the single data stream while preserving the synchronization with the other data stream elements of different media contained in the single data stream.

The communication protocol may further enable the transmitter to insert at least one data stream element of a selected medium into the single data stream and to synchronize it according to the synchronization of the other media elements of the single data stream.

The communication protocol may further enable the transmitter to convert the extracted data stream element into an inserted data stream element. Such conversion may include: converting speech to text, converting text to speech, converting text to image, converting video to still picture, converting still picture to graphics, converting video to animation, converting resolution, converting compression, converting resolution, converting color depth, etc.

It is appreciated that the communication protocol may further enable the transmitter to modify the single data stream by extracting, removing, adding, inserting, changing, converting, and/or replacing one or more elements of the single data stream to adapt the transmitted single data stream to a characteristic of a communication network, and/or to a characteristic of a receiver, and/or to a characteristic of the environment of the receiver. The network characteristic may include bandwidth, latency, jitter etc. The characteristic of the receiver may include display resolution, display size, number of pixels in a display, processing power, etc. The characteristic of the environment may include noise conditions, lighting conditions, etc.

As shown in FIGS. 1, 3, and 4, a streaming file such as shown and described with reference to FIGS. 8 and 9, may travel through two or more servers (including servers such as server 12 and servers such as portable server 32). It is appreciated that any transmitter, whether a terminal or a server, may reconfigure the streaming file by extracting, removing, adding, inserting, changing, converting, and/or replacing one or more elements of the single data stream. Particularly, a terminal transmitter may adapt the configuration of the streaming file, or single data stream, according to instructions received from the receiver party, which may be a server. Accordingly, a server transmitter may adapt the configuration of the streaming file, or single data stream, according to instructions received from the receiver party, which may be a server, or a terminal receiver, or a user of a terminal receiver.

As disclosed above, the instruction to adapt the streaming the or data stream is based on analyzing, detecting, and/or determining one or more characteristics of the network, the receiver, and/or the environment of the receiver, which may be carried by any of the transmitter and the receiver, or a user of the recipient terminal.

Reference is now made to FIG. 10, which is a block diagram of a plurality of multimedia streams received, mixed, and forwarded by a server, according to one exemplary embodiment.

As an option, FIG. 10 may be viewed in the context of the details of the previous Figures. Of course, however, FIG. 10 may be viewed in the context of any desired environment. Further, the aforementioned definitions may equally apply to the description below.

FIG. 10 shows three input multimedia streams designated respectively by numerals 72, 73, and 74, entering a server (not shown), and two output multimedia streams designated respectively by numerals 75, 76. The server may be any server such as server 12, or portable servers 17 or 32, as shown and described above. The elements of the streams are ordered by time from left (early) to right (later), and top line to bottom.

As shown in FIG. 10, the server creates two different output multimedia streams 75 by mixing some of the media streams and elements of the three input streams. For example, a portable server operating as a transmitter may mix two or more multimedia streams received from respective peripheral devices such as a smartwatch, a wrist-mounted camera, smart eyeglasses, etc.

Alternatively and/or additionally, a cloud server 12 close to a recipient terminal may mix two or more multimedia streams transmitted by different users and communicate them as a single, mixed, and synchronous stream to the recipient device.

In both examples, the selection of the input streaming data to be mixed into the output streaming multimedia can be determined by the transmitting user and/or the recipient user according to application needs, the transmitting device, the receiving device, and/or the server according to technical limitations (e.g., network limitation, device limitations, and ambient limitations, as disclosed above).

It is appreciated that in a situation such as multi-casting, where different receivers have different needs, selections, and/or limitations, the single multimedia stream may have different configurations along the way from the various transmitters to the various recipients to optimize the use of the network and minimize latency and jitter.

In the example of FIG. 10 input multimedia stream 72 includes two audio channels (A1, A2) and two high-definition video channels (V1, V2). Input multimedia stream 73 includes standard definition video stream (SV). Input multimedia stream 74 includes a series of pictures P and various data elements CD.

In the example of output multimedia stream 75 the first CMS determines a configuration including one of the audio channels (A1) and one of the video channels (V1) of input multimedia stream 72, and the video channel of input multimedia stream 73. As the bandwidth needs of the audio and video stream of input multimedia stream 72 are higher than those of the video channel of input multimedia stream 73 the output multimedia stream 75 includes more A1 and V1 elements than SV elements.

Thereafter, a second CMS element determines a different configuration including all the audio and video channels of input multimedia stream 72, a particular data element CD from input multimedia stream 74. Thereafter, a third CMS elements changes the configuration of the same single multimedia stream 75 to include the SV from input multimedia stream 73 and selected CD elements from input multimedia stream 74.

In the example of output multimedia stream 76, due to limitations such as, for example, bandwidth limitations, the first CMS determines a low bandwidth configuration including SV from input multimedia stream 73 converted into low-quality SV* and P and CD from input multimedia stream 74. Thereafter, a second CMS, adds A1 and V1 from input multimedia stream 72 where A1 is converted into text CT and V1 is converted into graphic animation.

It is appreciated that any server along the way from one or more input devices obtaining any type of content (e.g., medium, data, etc.) and one or more output devices presenting any type of content (e.g., medium, data, etc.) may join or add one or more input contents (or any number of elements thereof) into a single multimedia stream. Similarly, any server along the way from one or more input devices obtaining any type of content (e.g., medium, data, etc.) and one or more output devices presenting any type of content (e.g., medium, data, etc.) may extract one or more input contents (or any number of elements thereof) from the single multimedia stream. Consequently, any server along the way from one or more input devices obtaining any type of content and one or more output devices may convert any number of elements from one type of content into another type of content.

Therefore, a single transmitter may create a combined multimedia file and send it to a plurality of users (multi-casting), where different users receive different versions of the original multimedia file, where such different versions may have parts, or streams removed, replaced, converted, added, etc. Similarly, a user, or a recipient device, may source data and/or content from a plurality of source devices, and receive these data or content streams in the form of a single multimedia file combining the data or content streams in a synchronous manner.

Figure 11:
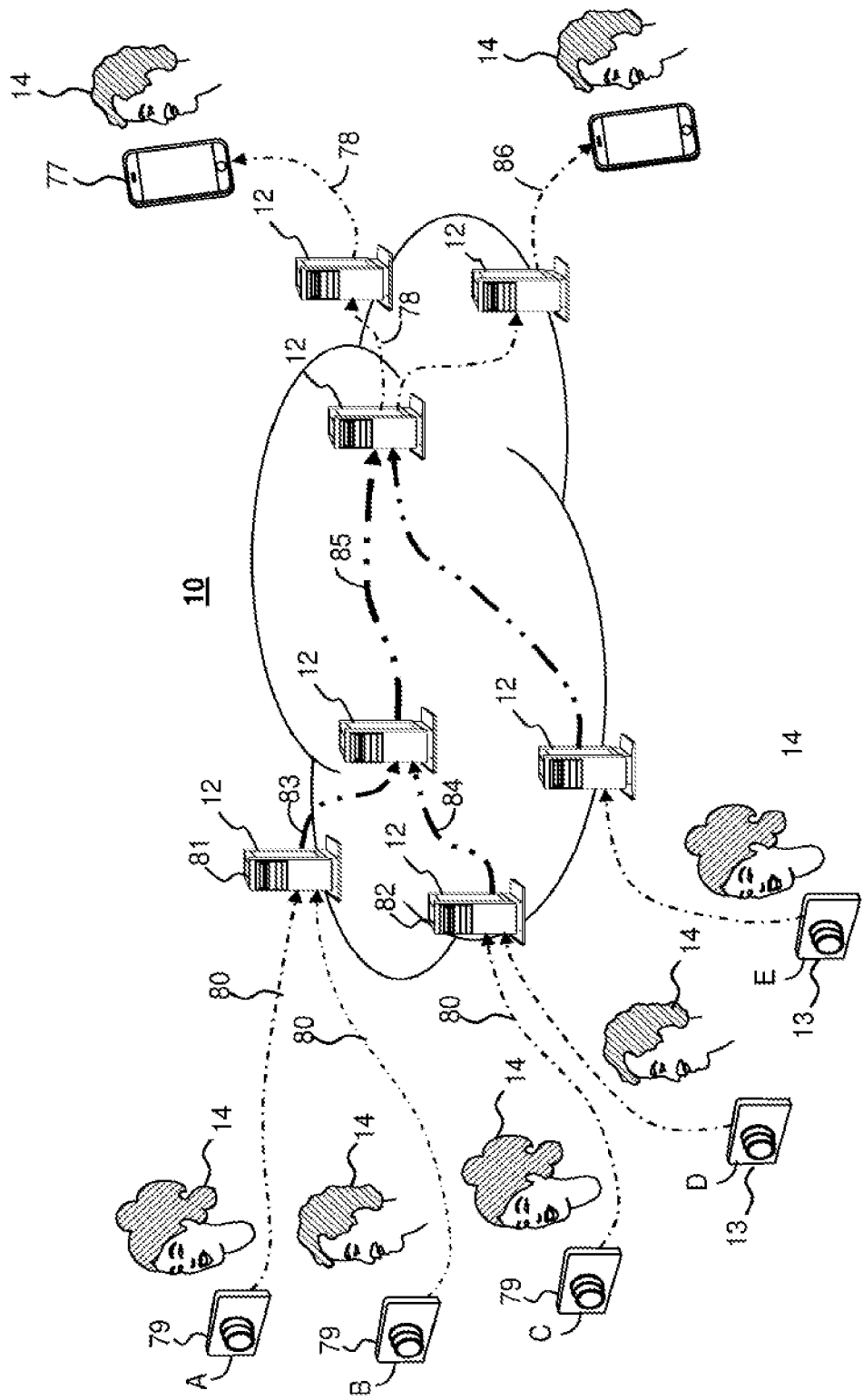
FIG. 11 is an illustration of a multimedia communication system sourcing a plurality of inputs into a single multimedia file.

Reference is now made to FIG. 11, which is an illustration of a multimedia communication system 10 sourcing a plurality of inputs into a single multimedia file, according to one exemplary embodiment.

As an option, the illustration of FIG. 11 may be viewed in the context of the details of the previous Figures. Of course, however, the illustration of FIG. 11 may be viewed in the context of any desired environment. Further, the aforementioned definitions may equally apply to the description below.

As shown in FIG. 11, a user 14 operating a recipient terminal 77 receives a single multimedia file 78 sourced from a plurality of transmitter terminals 79, which are illustrated, for example, as cameras but may be any type of sourcing devices. Transmitter terminals 79 are designated by characters A, B and C. Each of transmitter terminals 79 may communicate a multimedia file 80 including one or more streams S. A stream S may include audio, video, text, geolocation data, motion data, orientation data, etc. For example, each of transmitter terminals 79 transmits a multimedia file containing two streams designated as AS1, AS2, BS1, BS2, and CS1, CS2.

Servers 12 designated by numerals 81 and 82, respectively, receive the multimedia files and each transmits a multimedia file combining the received multimedia file. Therefore, multimedia file 83 includes multimedia files AS1, AS2, BS1, and BS2, while multimedia file 84 includes multimedia files CS1, CS2, DS1, and DS2. Consequently, multimedia file 85 includes multimedia files AS1, AS2, BS1, and BS2, CS1, CS2, DS1, and DS2. Thereafter, multimedia file 78 includes multimedia files AS1, AS2, BS1, and BS2, CS1, CS2. Similarly, multimedia file 86 may include multimedia files AS1, AS2, DS1, DS2, ES1 and ES2).

As shown in FIG. 11, multimedia communication system 10 may create a single, synchronous, multimedia file by consolidating streams, and/or multimedia files, sourced, or originated, or produced, independently, by a plurality of source devices, for example, by consolidating their respective clocks.

It is appreciated that, for example, if at least one stream element (e.g., element 63 of Fig. of 8) of AS1 or AS2 is synchronized with at least one stream element of BS1 or BS2, and at least one stream element of BS1 or BS2 is synchronized with at least one stream element CS1 or CS2 then, for example, any element of AS1 can be synchronized with any element of CS2 and a multimedia file of AS1 and CS2 can be created with a consolidated clock.

It is appreciated that such action of removal, addition, replacement, conversion, etc., of one or more streams from a multimedia file or into a multimedia file may be effected in real-time, for example, by using or adding a single CMS element within the multimedia file.

Multimedia communication system 10 may adapt the structure of the combined multimedia file transmitted to a recipient device or user according to various conditions associated with the communication network, the recipient device, the environment of the recipient device, and characteristics associated with the recipient user. The structure of the combined multimedia file refers to various characteristics of the content and/or data streams contained in the multimedia file. Multimedia communication system 10 may, for example, remove content and/or data streams from the multimedia file, add content and/or data streams into the multimedia file, and convert content and/or data streams contained in the multimedia file into other forms, formats, and/or types.

For example, scenarios that may affect the structure of the multimedia file may include permanent and/or temporary personal impairment such as visual impairment, hearing impairment, etc. Permanent and/or temporary personal unavailability or incapacity to receive particular types of media. Such situations may be derived and/or identified, for example, from a diary or a similar computerized facility, from the use of particular peripheral devices such as earpieces or a car speakerphone system, according to the time of day or day of the week, by sensing the environment, etc.

For example, sensing the environment may include sensing the speed of motion such as riding a car, sensing ambient noise and/or light conditions, etc. Multimedia communication system 10 may adapt the multimedia file to the geolocation of the recipient device such as home, workplace, open public place, indoor public place, airplane mode, roaming, etc.

Although descriptions have been provided above in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. It is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area net work (WAN), or the connection may be made to an external computer (for example, through the Internet using an Internet Service Provider). In some embodiments, electronic circuitry including, for example, programmable logic, circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a software module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant clients, target services, protocols, communication networks, messages and tickets will be developed and the scope of the term client, target service, protocol, communication network, message and ticket is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A computer-implemented method for communicating a plurality of media over a communication network, the method comprising:
   establishing a connection between a server communicatively coupled to the communication network and a plurality of sources, wherein each source streams multimedia content;
   obtaining, at the server, a selection of a first source and a second source, the first and second sources being among the plurality of sources;
   receiving, at the server, at least a first content stream from the first source and at least a second content stream from the second source, wherein each of the first content stream and the second content stream comprise a sequence of elements of a medium type;
   transmitting, from the server, the first and second content streams as a single multimedia stream, the single multimedia stream comprising an interleaved sequence of data elements of the first and second content streams, wherein:
      the selection of the first and second content streams identifies a first source identifier designating the first content stream and a second source identifier designating the second content stream;
      the first content stream comprises the first source identifier; and
      the second content stream comprises the second source identifier; and
   one or both of:
      preserving synchronization between data stream elements of different media in the single multimedia stream; or
      consolidating a first clock associated with the first source and a second clock associated with the second source.

2. The method according to claim 1, wherein:
   obtaining the selection of the first source and the second source comprises receiving the selection from a recipient terminal; or
   transmitting the first and second content streams as a single multimedia stream comprises transmitting the single multimedia stream from the server to the recipient terminal.

3. The method according to claim 1, additionally comprising, to preserve the synchronization, at least one of:
   inserting, into the first content stream, a first element;
   inserting, into the second content stream, a second element; or
   inserting, into the single multimedia stream, a third element.

4. The method according to claim 1, wherein the first and second content streams comprise content of a same medium type.

5. The method according to claim 1, wherein preserving the synchronization comprises at least one of: extracting, removing, adding, changing, or replacing a data stream element in the single multimedia stream.

6. The method according to claim 1, wherein the medium type comprises at least one of: sound, speech, image, video, text, graphics, animation, metadata, control information, or session information.

7. The method according to claim 1, additionally comprising inserting a control element into the single multimedia stream, the control element configured to perform at least one of: add a content stream, remove a content stream, or change a content stream.

8. The method according to claim 1, further comprising transmitting, from the server, an identifier of a stream body of the single multimedia stream.

9. A computer-implemented method for communicating a plurality of media over a communication network, the method comprising:
   establishing a connection between a recipient terminal communicatively coupled to the communication network and a plurality of sources, wherein each source streams multimedia content;
   obtaining, at the recipient terminal and from a user of the recipient terminal, a selection of a first source and a second source, the first and second sources being among the plurality of sources;
   communicating the selection from the recipient terminal to a server communicatively coupled to the communication network;
   receiving, at the recipient terminal and from the server, a single multimedia stream comprising an interleaved sequence of data elements of the selected first and second sources, the single multimedia stream comprising at least a first content stream from the first selected source and a second content stream from the second selected source, wherein each of the first content stream and the second content stream comprise a sequence of elements of a common medium type, wherein:
the selection of the first and second content streams identifies a first source identifier designating the first content stream and a second source identifier designating the second content stream;
the first content stream comprises the first source identifier; and
the second content stream comprises the second source identifier; and
one or both of:
preserving synchronization between data stream elements of different media in the single multimedia stream; or
consolidating a first clock associated with the first source and a second clock associated with the second source.

10. The method according to claim 9, wherein:
obtaining the selection of the first source and the second source comprises receiving the selection from a recipient terminal; or
transmitting the first and second content streams as a single multimedia stream comprises transmitting the single multimedia stream from the server to the recipient terminal.

11. The method according to claim 9, additionally comprising, to preserve the synchronization, at least one of:
inserting, into the first content stream, a first element;
inserting, into the second content stream, a second element; or
inserting into the single multimedia stream a third element.

12. The method according to claim 9, wherein the first and second content streams comprise content of a same medium type.

13. The method according to claim 9, wherein preserving the synchronization comprises at least one of: extracting, removing, adding, changing, or replacing a data stream element in the single multimedia stream.

14. The method according to claim 9, additionally comprising inserting a control element into the single multimedia stream, the control element configured to perform at least one of: add a content stream, remove a content stream, or change a content stream.

15. The method according to claim 9, further comprising transmitting, from the server, an identifier of a stream body of the single multimedia stream.

16. A non-transitory, computer-readable medium including instructions that, when executed by at least one processor, cause the processor to perform operations for communicating a plurality of media over a communication network, comprising:
establishing a connection between a recipient terminal communicatively coupled to the communication network and a plurality of sources, wherein each source streams multimedia content;
obtaining, at the recipient terminal and from a user of the recipient terminal, a selection of a first source and a second source, the first and second sources being among the plurality of sources;
communicating the selection from the recipient terminal to a server communicatively coupled to the communication network;
receiving, at the recipient terminal and from the server, a single multimedia stream comprising an interleaved sequence of data elements of the selected first and second sources, the single multimedia stream comprising at least a first content stream from the first selected source and a second content stream from the second selected source, wherein:
the selection of the first and second content streams identifies a first source identifier designating the first content stream and a second source identifier designating the second content stream;
the first content stream comprises the first source identifier; and
the second content stream comprises the second source identifier; and
one or both of:
preserving synchronization between data stream elements of different media in the single multimedia stream; or
consolidating a first clock associated with the first source and a second clock associated with the second source.

* * * * *